US008831992B2

(12) United States Patent
Price, III et al.

(10) Patent No.: US 8,831,992 B2
(45) Date of Patent: Sep. 9, 2014

(54) APPARATUS AND METHOD FOR FACILITATING CRYPTOGRAPHIC KEY MANAGEMENT SERVICES

(75) Inventors: William F. Price, III, Los Altos, CA (US); Jonathan D. Callas, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 543 days.

(21) Appl. No.: 12/334,276

(22) Filed: Dec. 12, 2008

(65) Prior Publication Data

US 2009/0154705 A1    Jun. 18, 2009

Related U.S. Application Data

(60) Provisional application No. 61/013,450, filed on Dec. 13, 2007.

(51) Int. Cl.
| | |
|---|---|
| *G06Q 30/00* | (2012.01) |
| *H04L 9/12* | (2006.01) |
| *H04L 9/08* | (2006.01) |
| *G06Q 20/38* | (2012.01) |

(52) U.S. Cl.
CPC ............. *G06Q 20/388* (2013.01); *H04L 9/12* (2013.01); *H04L 9/0833* (2013.01); *H04L 9/0825* (2013.01)
USPC ............................................... 705/50; 705/51

(58) Field of Classification Search
USPC ......................................... 705/51; 726/26, 28
See application file for complete search history.

(56) References Cited

U.S. PATENT DOCUMENTS

| | | | | |
|---|---|---|---|---|
| 7,171,557 | B2* | 1/2007 | Kallahalla et al. ............. | 713/165 |
| 7,340,600 | B1* | 3/2008 | Corella ........................ | 713/155 |
| 8,064,604 | B2* | 11/2011 | Youn ............................ | 380/277 |
| 2004/0001594 | A1* | 1/2004 | Krishnaswamy et al. .... | 380/277 |
| 2004/0054893 | A1* | 3/2004 | Ellis .............................. | 713/165 |
| 2006/0210085 | A1* | 9/2006 | Ho et al. ....................... | 380/279 |
| 2006/0242068 | A1* | 10/2006 | Jogand-Coulomb et al. ... | 705/50 |
| 2007/0005965 | A1* | 1/2007 | Nalliah et al. ................ | 713/168 |
| 2007/0230706 | A1 | 10/2007 | Youn | |

OTHER PUBLICATIONS

Canadian Office Action, Canadian Application No. 2,706,145, Sep. 24, 2013, 2 pages.
PCT US08/86708 ISR-WO, Jan. 28, 2009, PGP Corporation.

* cited by examiner

*Primary Examiner* — Calvin L Hewitt, II
*Assistant Examiner* — John M Winter
(74) *Attorney, Agent, or Firm* — Fenwick & West LLP

(57) ABSTRACT

A cryptographic key management system includes executable instructions to control access to keys based on permissions for users and groups. Executable instructions support cryptographic operations on the keys through a network application program interface. The cryptographic operations are controlled by the permissions. The cryptographic operations are distributed between the servers and the clients in accordance with criteria specifying optimal execution of cryptographic operations between the servers and the clients.

20 Claims, 3 Drawing Sheets

APPARATUS AND METHOD FOR FACILITATING CRYPTOGRAPHIC KEY MANAGEMENT SERVICES

CROSS-REFERENCE TO RELATED APPLICATIONS

This application claims priority to U.S. Provisional Patent Application 61/013,450, filed Dec. 13, 2007, entitled "Apparatus and Method for Facilitating Cryptographic Key Management Services", the contents of which are incorporated herein by reference.

This application is also related to the concurrently filed patent application entitled "Apparatus and Method for Processing Fragmented Cryptographic Keys", Ser. No. 12/335,242, filed Dec. 12, 2008.

FIELD OF THE INVENTION

This invention relates generally to data security. More particularly, this invention relates to the management of cryptographic keys in a networked environment.

BACKGROUND OF THE INVENTION

Cryptography moved from military applications to a consumer application in the form of email. Additional consumer applications, such as file storage, network storage, and whole disk encryption followed. These consumer applications present challenging key infrastructure issues.

It is necessary to provide key management services that allow an entity to manage all of the keys of users and systems. Currently, many systems have keys that are essentially unmanaged and are susceptible to security attacks. Commonly, keys have no lifecycle management. In some instances, keys are many years old and there is no way to re-key them, replace them or revoke them.

Accordingly, it is desirable to provide an extensible, scalable architecture that can manage keys in a consolidated fashion.

SUMMARY OF THE INVENTION

A cryptographic key management system includes executable instructions to control access to keys based on permissions for users and groups. Executable instructions support cryptographic operations on the keys through a network application program interface. The cryptographic operations are controlled by the permissions. The cryptographic operations are distributed between the servers and the clients in accordance with criteria specifying optimal execution of cryptographic operations between the servers and the clients.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
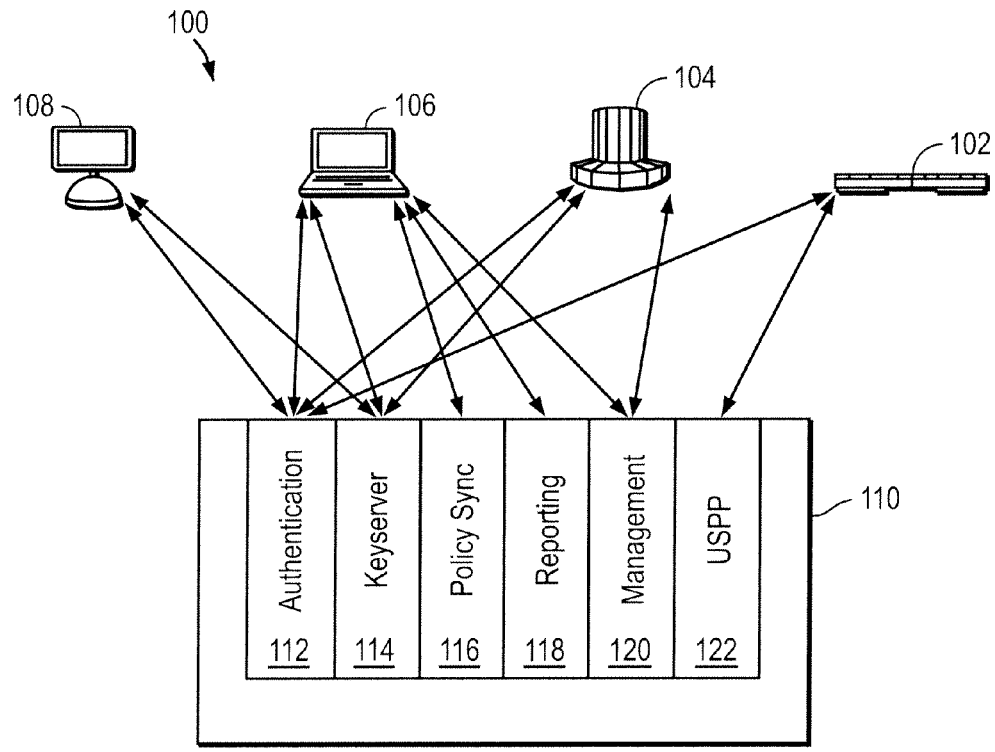
FIG. 1 illustrates a system configured in accordance with an embodiment of the invention.

FIG. 1 illustrates a system 100 configured in accordance with an embodiment of the invention. The system 100 includes a proprietary cryptographic server 102 (e.g., a PGP Universal Server sold by PGP, Inc. Menlo Park, Calif.), a non-proprietary server 104, a proprietary desktop 106 (e.g., a PGP desktop), and at least one additional client device 108. Components 102-108 are linked through a service protocol 110, which is executable on each of the components.

The service protocol 110 operates as a communications hub protocol for key management, policy synchronization, geographic clusters, key servers and server federation. The service protocol 110 is designed to provide key and policy services to non-proprietary servers or clients. The service protocol 110 allows management of a proprietary cryptographic server via a management application program interface.

As shown in FIG. 1, the service protocol 110 includes an authentication module 112, a key server module 114, a policy synchronization module 116, a reporting module 118, a management module 120 and a protocol module 122.

In one embodiment, the service protocol is an eXtensible Markup Language (XML) protocol using the Simple Object Access Protocol (SOAP). The service protocol may be transported via the Hyper Text Transport Protocol (HTTP) or the Hyper Text Transport Protocol Over Secure Socket Layer (HTTPS). Interfaces to other systems are built on top of the service protocol. The modules/functions 112-122 form an integrated whole consolidating all policy, management, key server functionality and synchronization into one, public protocol. This public protocol may be adopted by others and may operate to provide tools to integrate with any number of products.

The key server 114 consolidates all key access into one interface and allows one to provide many additional features, such as access control, and serving of both public and private keys. In effect, the key server 114 extends the concept of a normal key server for public keys to handle private keys, symmetric keys, and fine-grained access control to support key management services.

An Application Program Interface (API) supports the key management services. The API also supports integration with other systems. The API supports various keys in a generic fashion.

The system is operable with two types of consumers: users and devices. A user corresponds to a recognized user name in a system. A user has a one-to-one relationship with a human. A user is also a consumer in a key management service deployment. For instance, an intranet application may run on user systems in a given deployment that would use the service protocol and take advantage of the user's credentials for authentication. Applications may be integrated into deployments that use keys. Those keys are managed by the key management service, thereby making the users potential consumers. A user can be internal, external or an administrator.

Devices are a new type of consumer supported by the key management service. Devices correspond to servers and any other device where user interaction is generally unexpected.

Devices typically hold keys. The key management service manages keys for devices as well as users.

Devices and users are importable manually. Existing products require that all users be automatically generated. That limitation does not hold up in an environment that includes unattended devices. The system also supports user-initiated enrollment. This may be done by providing an internal web interface to enroll a given user or device. This feature alleviates a significant burden of managing the creation of users and devices in a system. The invention allows one to manage broad group policies associated with the key management service. Manual import means that all of the processes of user creation are executed as part of some operation, such as key generation. In one embodiment, a newly imported user is simply given keys on import.

One embodiment of the invention supports six techniques for authenticating into the service protocol 110. Lightweight Access Directory Protocol (LDAP) credentials may be passed from a consumer to authenticate against an external directory. If the credentials are verified by the directory, the consumer is authenticated. The consumer may then be provided with a secure cookie to optimize future authentications.

Email authentication may also be used. In this approach, an email server is contacted to authenticate an email address. In this encrypted request, a response key is provided to the server, which is then used to encrypt a response via email to the address provided. The client decrypts the response that contains a secure cookie, which can be used for future authentications.

A secure cookie technique may also be used. This technique relies upon other authentication methods. A key is provided to the client with encrypted credentials that allow it to perform future authentications in an automated fashion.

Pass words may also be used for authentication. In this case, the consumer authenticates using a standard user name and pass word that is authenticated via a pass word manually imported by an administrator or enrolled via user-initiated enrollment.

Similar to the pass word method, a device may hold a token that it can use to authenticate using a public key challenge-response over the service protocol. Such a public key would be imported manually or via self-enrollment.

An unauthenticated consumer may also be supported by the system. In this case, an administrator sets limited access rights for an unauthenticated consumer.

Key management services through the disclosed API operate to manage two types of keys: Managed Encryption Keys (MEKs) and Managed Asymmetric Keys (MAKs). MAKs are key pairs managed for a consumer by the key management service. MAKs may be standard key pairs, such as RSA, Diffie-Hellman or Elliptic Curve.

Figure 2:
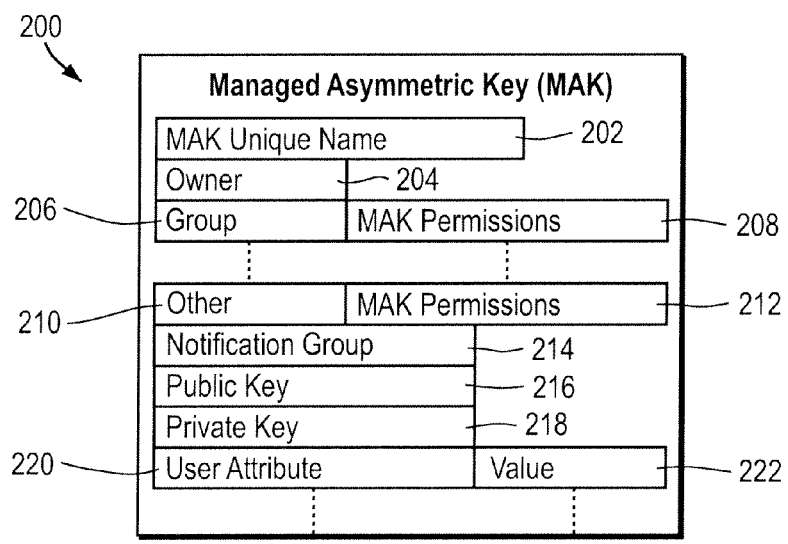
FIG. 2 illustrates a managed asymmetric key utilized in accordance with an embodiment of the invention.

FIG. 2 illustrates a MAK 200 configured in accordance with an embodiment of the invention. The MAK 200 has a unique name 202 and a designated owner 204. A given MAK may be shared by multiple consumers, as defined by the MAK's group 206. Alternatively, a group itself can own a MAK. Each group 206 may have separately specified permissions. An "Other" field 210 may be used to specify permissions 212 for undefined consumers. A notification group 214 may be used for updates to the MAK or any of its associated MEKS. From a MAK perspective, a notification group allows automatic notification when events, such as the issuance of a new certificate, new sub-keys or other metadata changes are applied to a MAK. A public key 216 and private key 218 are also associated with the MAK 200. In one embodiment, a user attribute 220 and associated value 222 may also be specified. Various fields associated with the MAK 200 may be stored separately as metadata.

Figure 3:
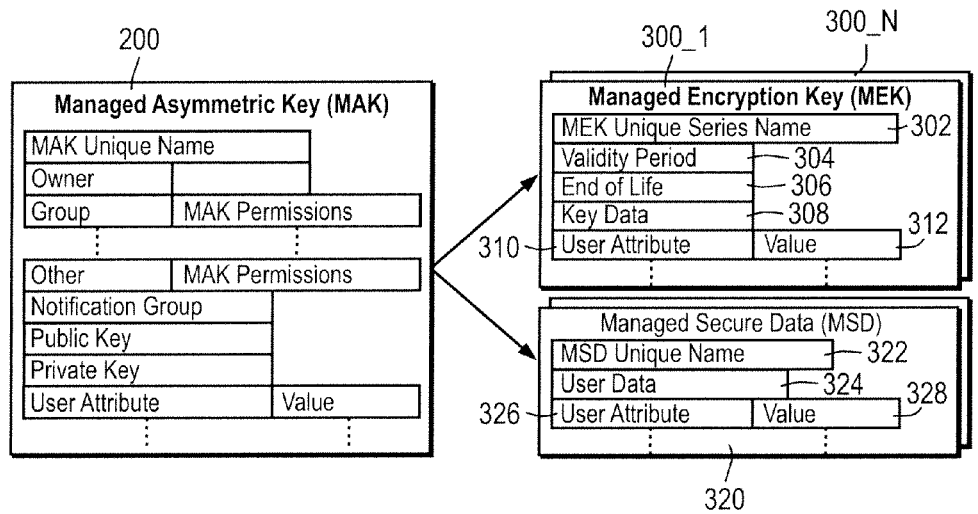
FIG. 3 illustrates managed encryption keys and managed secure data objects utilized in accordance with an embodiment of the invention.

MEKs are symmetric keys used for ciphering data. Depending upon consumer policy, a consumer can create any number of MEKs. A MEK is associated with a single MAK and is stored encrypted to that MAK. FIG. 3 illustrates a MAK 200 and an associated set of MEKs 300_1 through 300_N. In one embodiment, each MEK 300 has a series name 302, a validity period 304, and end of life field 306, key data 308, a user attribute 310 and an associated value 312. Each MEK ciphers associated data 320. The ciphered data 320 may have an associated unique name 322, the data itself 324, a user attribute 326 and associated value 328.

A MEK may be an arbitrarily large symmetric key that may use less of the key for a given situation. A given MEK is controlled by one MAK. Permissions for a MAK grant permissions on all associated MEKs. MEKS have several pieces of metadata associated with them. The validity period 304 allows MEK rotation functionality. When a MEK is rotated, the old MEK is retained as an expired MEK so it can be used to decrypt older data and a new MEK is automatically created. The notification group 214 of the MAK is notified about new MEKs.

The validity period 304 may specify a duration, start and end date. The duration is a time frame, such as 2 weeks. The start and end dates are filled in by the key management service as the MEK is generated and then decommissioned. This allows for easier searching of older MEKs. The end of life field 306 may specify a date, after which the key management service will stop renewing the MEK. The end of life field may also be set to "never" to establish a perpetual MEK.

MEKs are not deleted. Rather, a MEK expires after a validity period. When a change transpires for a given MEK series on a MAK, the MAK's notification group is notified of the change. In the case, for instance, of a new MEK generated in a series, a Start MEK Rotation event is issued to the notification group. When all members of the group have received the notification, the MEK is rotated and an End MEK Rotation event is issued to notify the members that the rotation is complete. Thus, each member can synchronize to use the correct MEK at the correct time.

MEKS and MAKs are named. This provides a technique for specifying keys. For instance, a consumer might create a MAK named "HR Backup Keys". The HR IT group, using a group concept may own that MAK. A set of MEKs could be created and owned by the MAK, such as "2005 HR Data", "2006 HR Data", etc.

Figure 4:
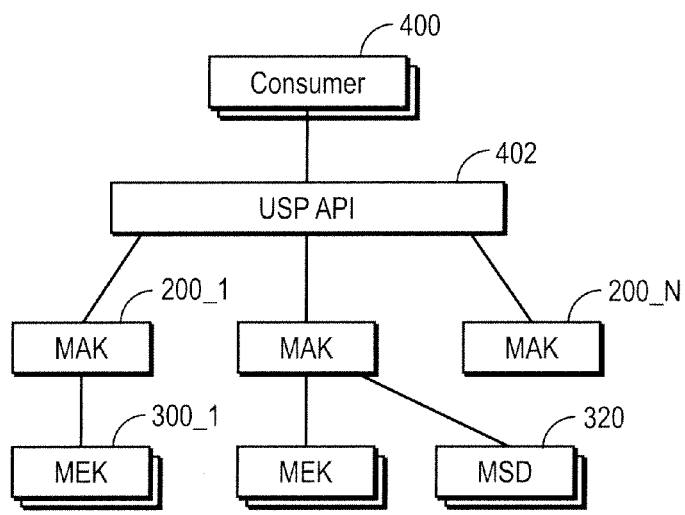
FIG. 4 illustrates object interactions associated with an embodiment of the invention.

FIG. 4 illustrates relationships established in accordance with an embodiment of the invention. A consumer 400 interfaces with the API 402 of the invention. In turn, the API 402 interfaces with a set of MAKs 200_1 through 200_N. A set of MEKs (e.g., 300_1) are associated with a MAK (e.g., 200_1).

Many consumers may have access to a given MAK based on a permissions and group. A MAK may own many MEKS and a MEK may have only one parent MAK. All operations are performed via the service protocol API 402. A MEK is conceived as a series. One may query a given MEK in a series by a combination of its unique name and an index or date. In the event that no validity period is defined for a given MEK, the MEK simply has no rotation frequency.

A MAK contains metadata about itself. A MAK can own two different types of objects in a one-to-many relationship. The first is the MEK. The second is a managed secure data object 320. An MSD is essentially the same as a MEK, but it has arbitrary size, and is not pre-filled with random data as a MEK would be. MSDs allow consumers to store arbitrary secure objects.

A MAK may be internally represented as a known Pretty Good Privacy (PGP) key. This provides one with metadata functionality, such as expiration, revocation, sub keys and more. Existing key use flags for a PGP key include: usage-sign, usage-encrypt-communications, usage-encrypt-storage, private-split and private-shared. The key management service adds to these keys to include: usage-encrypt-storage-netshare, usage-encrypt-storage-whole-disk-encryption, usage-verify-always, and usage-confidential. The verify-always flag tells one using the key that it should always be verified at the source prior to usage. The confidential flag, which can be used either on a top-level key or sub-key, means that data decrypted using such a key should never be stored in a decrypted form.

A usage-custom flag may also be specified. If the usage-custom flag is set on a key or sub-key, the custom usage will be specified in a new notation packet, which contains a reverse domain-constrained specifier for custom usages. For instance, marking keys specifically for use with a special application could contain a specifier of "com.lockheed.jetproject".

Note that the objects of the invention support attribute/value pairs. This is helpful for storage of metadata about objects. For instance, a customer may wish to store a backup tape identification number directly associated with a specific MEK. Later, the customer can ensure the right key is used by using the service protocol to search for the MEK with the exact match for the specific backup tape. The name of an attribute is user-defined, as is the value, which can be numeric, a textual string, or other piece of data.

The key management services rely upon domains, groups, permissions and consumer policy. A domain is a top-level grouping construct. The members of a domain are Internet domain names. Grouped domain names are part of a single domain. For instance, pgp.com and pgp.eng.com are part of the same PGP domain because they are managed by the same consumers. On the other hand, something like pgp-spinoff.com may be its own domain managed at the same resource. The primary thrust behind domain management is running essentially separate instances of a key server on the same system.

The connected aspects of domains are limited to system-level functionality like restarting the server. Groups, consumers, MAKs/MEKs/MSDs, consumer policies and most objects are partitioned between domains. The administrator permissions of a given consumer in a specific domain may allow server-wide administration capabilities.

Figure 5:
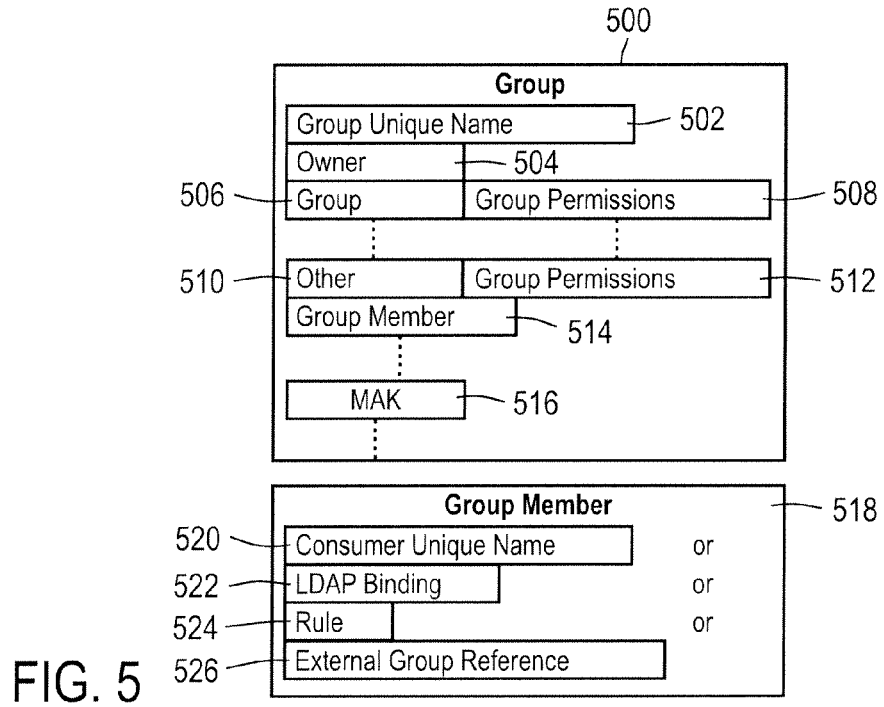
FIG. 5 illustrates a data structure to characterize a group in accordance with an embodiment of the invention.

A group is a rule-defined collection of consumers. FIG. 5 illustrates a group 500 associated with an embodiment of the invention. The group 500 includes a unique name 502 and an owner 504. A group 506 may have associated permissions 508. An "other" field 510 may also have associated permissions 512. The group 500 may also include a group member 514 and a MAK 516. A group member, such as group member 518, may specify a consumer unique name 520, an LDAP binding 522, a rule 524 and/or an external group reference 526.

A consumer may belong to many groups. A consumer has only one consumer policy. The binding of consumers to a group may be LDAP associations, explicit specification, server-defined rules (for example, all consumers that are members of the "HR" group and "Finance" group) or an external group reference. Thus, groups can be hierarchical—a consumer can belong to many groups and groups can be members of groups. For instance, the "Development" group is part of the "Engineering" group. Another example of a group would be an explicitly-defined member group: Fred, Bob, and Martha. Like a MAK, a group also has an owner 504 and a series of group specifiers that grant group permissions. The owner of a group has the ability to change the group permissions and could also allow members of a group to have access. The owner defines the rules that establish the members of the group. In one embodiment, a group has a unique name 502, owner 504, a series of groups 506 with group permissions 508 specific to the group, and a list of rules defining the members—usually a list of consumers or an LDAP association.

Internal group references include direct references, such as username, LDAP references to a matching directory of internal users, references to other groups, such as "Development" as part of "Engineering", or other rule-based membership, such as all consumers assigned to consumer policy 1 and 2. External group references designate groups or consumers outside a domain. A URL syntax is used to specify an external group references, such as "usp:/ssl/pgp-spinoff.com:execstaff". A group can own MAKs. For instance, one may create a group entitled "HR", give it an LDAP binding for HR in an organization's directory, give it a MAK with appropriate email and NetShare usage flags, and then all members of HR would be able to share the HR MAK and use it for decrypting HR mailing lists, HR NetShare files, etc.

MAK permissions are assigned to MAKs. Other objects have different permissions. For instance, groups have their own group permissions related to whether one can change the membership and access control of a group. Each MAK has a list of permissions controlled by the owner of the MAK, or if allowed by the owner, anyone in the MAK's group. Default permissions on a MAK are inherited from the consumer policy at creation time. Separate lists of permissions are maintained for the owner 204, group 206, and other field 210. In a typical scenario, permissions for the other field 210 include the ability to read public keys. Permissions for the owner would typically be all permissions. An embodiment of the invention relies upon the following MAK permissions:

Owner: can delete or rename any key or sub-key of this MAK
    Read Public: can retrieve any public keys on this MAK
    Read Private: can retrieve any private keys on this MAK
    Encrypt MAK: can encrypt to this MAK
    Decrypt MAK: can decrypt to this MAK
    Sign MAK: can sign this MAK
    Verify MAK: can verify this MAK
    Create MEK: can create new MEKs on this MAK
    Delete MEK: can delete existing MEKs on this MAK
    Rekey MEK: can create a replacement MEK for an existing MEK with a new validity period
    Encrypt MEK: can encrypt to any valid MEK on this MAK
    Decrypt MEK: can decrypt with any MEK on this MAK
    Retrieve MEK: can extract raw MEK data from any MEK on this MAK
    Authority Delegation: Can delegate authority for this key to any external consumer/group.

Observe the nuances of these permissions. One can be given the ability to decrypt a MEK, but not Retrieve a MEK. In other words, the sever will allow the consumer with permission to give encrypted data to the server, decrypt it, and then hand back the decrypted data. The consumer cannot simply retrieve the MEK and use it for its own purposes.

Another interesting nuance is a delegation feature. Suppose an executive assistant needs to decrypt using an executive's key. The assistant is added to a group assigned to the MAK. MAK permissions for that group allow Decrypt MAK, but not Read Private. In that scenario, the executive could be using an SKM key, but the private key would not be provided to the executive assistant's client. Rather, the server performs the decryption on the sever and the private key itself is never provided.

Figure 6:
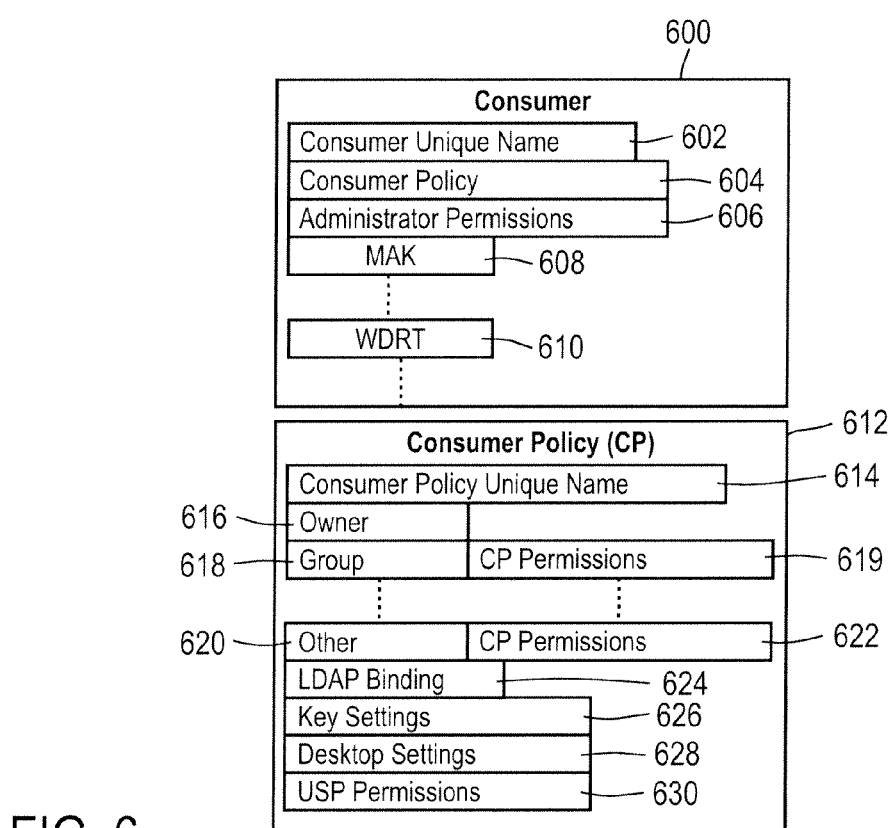
FIG. 6 illustrates a data structure to characterize a consumer in accordance with an embodiment of the invention.

FIG. 6 illustrates an embodiment of a consumer 600 and associated consumer policy 612. In this embodiment, a consumer 600 includes a consumer unique name 602, a consumer policy 604, administrator permissions 606, a MAK 608 and a Whole Disk Recovery Token (WDRT) field 610. The associated consumer policy 612 includes a consumer policy unique name 614, owner 616, group 618 and associated permissions 619. An other field 620 and associated permissions 622 may also be specified. An LDAP binding 624, key settings 626, desktop settings 628 and service protocol permissions 630 may also be specified.

Attention now turns to the management component 120 of the service protocol. The management component 120 may be implemented as an API with four segments: consumers, key management, data and administration. The consumer segment allows creation, deletion, querying/setting of properties, and otherwise managing the consumers of the system with the functionality provided in the sever user interface. The API allows automation of various administrative tasks. Consider a situation where a bank adds and removes ATMs on a regular basis. It is desirable to automate the creation, management and removal of consumers from the system. The invention allows consumers to be managed directly in an automated fashion.

A key management API allows one to create and manage MAKs and MEKs. Functions include generating MAKs/MEKs, importing/exporting MAKs/MEKs, specifying permissions/usage/groups on a MAK, revoking or setting the validity period of a MAK, management of sub-keys and their properties/usage, managing attributes and values on objects, and activating a service protocol for a MAK.

The data API allows asymmetric and symmetric cryptographic operations using MAKs and MEKs. It also provides the management API for objects. Example operations include:
  submitting a MEK for encryption to a MAK
  submitting an arbitrary hash for signing by a MAK
  decrypting a MAK-encrypted object to reveal the MEK
  verifying a MAK signature on a hash
  encryption/signing/decryption/verification of arbitrary data objects
  creation/deletion of data objects
  generalized provision of random numbers.

The data API provides core encryption services. The services are useful at many different levels, including handling importing a file as a data object and encrypting it to a MAK.

The administration API facilitates the management of a wide range of server functionality. Functionality may include restarting, backups, applying updates, cluster configuration, changing policy, group management and other administrative tasks. Because administrator are also consumers, a user with administrative privileges can automate activities via key management services with the same access that they would have in the server user interface.

The API utilized with embodiments of the invention may be in any number of forms. In general, the API will include a function call and a list of parameters. For example, the API may support the following: CreateConsumer (name, permissions, emailAddress). Similar constructs can be created for decrypting, encrypting, signing, verifying, signing with session key, generating key, and so forth. More particularly, such function calls are specified to support each of the operations discussed herein. Naturally, each of these functions may be implemented in any number of ways.

The API has an inherent feature that allows one to decouple dependence between keys and data. Usually, a decryption operation is performed by providing a single document with an encrypted symmetric key, which is encrypted to a public key, followed by the encrypted data that was encrypted using the symmetric key. The decryption engine decrypts the symmetric key using the private key associated with the public key. The decrypted symmetric key is then used to decrypt the data. Consider a situation where the private key is very high value and therefore should not be distributed. For example, the private key should remain on a single machine. If this is done, the single machine is susceptible to excess processing if all data blocks are sent to it for symmetric-level decryption. In such a scenario, the invention decouples the data from the keys. At the system where decryption is desired, the encrypted symmetric key is sent via the network to the high-security system containing the private key. The high-security system uses its private key to decrypt the symmetric key and send back the decrypted version via the network to the original machine. The high-security system checked permissions and access control and then decided it was appropriate to go ahead and perform the decryption operation for the original system. This allows one to have a system that just handles keys and some systems that just handle data. In this way and many others, the invention supports the distribution of tasks between servers and client using criteria that specifies optimal execution of cryptographic operations between the servers and clients. This criteria will commonly assess the location of keys and corresponding data.

An embodiment of the present invention relates to a computer storage product with a computer-readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer-implemented method, comprising:
receiving, at a client device from a consumer having a corresponding credential, a request to perform a cryptographic operation involving a managed asymmetric key;
identifying, by the client device, a group of which the consumer is a member based on the credential;
identifying, by the client device, cryptographic permissions associated with the managed asymmetric key specifying cryptographic operations involving the managed asymmetric key that members of the group are permitted to perform;
identifying, by the client device, a symmetric key associated with the managed asymmetric key;
storing, by the client device, an encrypted form of the symmetric key on the client device, the encrypted form of the symmetric key obtained by encrypting the symmetric key with a public key;
determining, by the client device, that the identified cryptographic permissions are insufficient to obtain a private key corresponding to the public key;
providing, by the client device, the encrypted form of the symmetric key to a first server;
receiving, by the client device, from the first server, a decrypted form of the symmetric key; and
decrypting, by the client device, content using the decrypted form of the symmetric key.

2. The computer-implemented method of claim 1, wherein membership in the group is defined by rules determining a set of consumers that are members, and wherein the rules for the group specify at least one other group that is a member of the group.

3. The computer-implemented method of claim 1, wherein the requested cryptographic operation operates on data using the managed asymmetric key, the performed steps further comprising:
identifying a plurality of distinct server systems to which to distribute processing of the requested cryptographic operation based at least in part on a location of the data and a location of the cryptographic key.

4. The computer-implemented method of claim 1, wherein the managed asymmetric key specifies the public key and the private key.

5. The computer-implemented method of claim 1, wherein the managed asymmetric key is associated with a plurality of managed symmetric encryption keys.

6. The computer-implemented method of claim 5, wherein the request is specified using an application program interface that includes a plurality of distinct function calls for cryptographic operations comprising:
retrieving the public key of the managed asymmetric key;
retrieving the private key of the managed asymmetric key;
signing data using the private key of the managed asymmetric key; and
removing one of a plurality of managed symmetric encryption keys associated with the managed encryption keys.

7. The computer-implemented method of claim 5, wherein the managed symmetric encryption keys include an associated validity period and an associated end of life.

8. The computer-implemented method of claim 7, the performed steps further comprising, at expiration of the validity period of one of the managed symmetric encryption keys:
marking the managed symmetric encryption key as expired; and
automatically creating a new symmetric encryption key and associating the new symmetric encryption key with the managed asymmetric key.

9. A non-transitory computer-readable medium having executable computer program instructions embodied therein that when executed by a processor perform the steps of:
receiving from a consumer having a corresponding credential, a request to perform a cryptographic operation involving a managed asymmetric key;
identifying, based on the credential, cryptographic permissions associated with the managed asymmetric key specifying cryptographic operations involving the managed asymmetric key that the consumer is permitted to perform;
identifying, a symmetric key associated with the managed asymmetric key;
storing accessing an encrypted form of the symmetric key on the client device, the encrypted form of the symmetric key obtained by encrypting the symmetric key with a public key;
determining that the identified cryptographic permissions are insufficient to obtain a private key corresponding to the public key;
providing the encrypted form of the symmetric key to a first server;
receiving from the first server, a decrypted form of the symmetric key; and
decrypting content using the decrypted form of the symmetric key.

10. The computer-readable storage medium of claim 9, the steps further comprising:
receiving, from the consumer, a plurality of additional requests to perform cryptographic operations involving the managed asymmetric key, wherein the requested cryptographic operations operate on data using the managed asymmetric key, and
identifying a plurality of distinct server systems to which to distribute processing of ones of the cryptographic operations based at least in part on a location of the data and a location of the cryptographic key.

11. The computer-readable storage medium of claim 9, wherein the managed asymmetric key specifies the public key and the private key.

12. The computer-readable storage medium of claim 9, wherein the managed asymmetric key is associated with a plurality of managed symmetric encryption keys.

13. The computer-readable storage medium of claim 12, wherein the request is specified using an application program interface that includes a plurality of distinct function calls for cryptographic operations comprising:
retrieving the public key of the managed asymmetric key;
retrieving the private key of the managed asymmetric key;
signing data using the private key of the managed asymmetric key; and
removing one of the plurality of managed encryption keys.

14. The non-transitory computer-readable medium of claim 9, further comprising identifying a group of which the consumer is a member, wherein membership in the group is defined by rules determining a set of consumers that are members, and wherein the rules for the group specify at least one other group that is a member of the group, and wherein identifying the cryptographic permissions comprises identifying cryptographic permissions associated with the managed asymmetric key specifying cryptographic operations involving the managed asymmetric key that members of the group are permitted to perform.

15. The non-transitory computer-readable medium of claim 9, wherein the requested cryptographic operation operates on data using the managed asymmetric key, the performed steps further comprising identifying a plurality of distinct server systems to which to distribute processing of the requested cryptographic operation based at least in part on a location of the data and a location of the cryptographic key.

16. A computer-implemented method, comprising:
   receiving, by a client device, from a user of a remote client device, a request to perform a cryptographic operation involving a managed asymmetric key;
   identifying, by the client device, based on a credential of the user, cryptographic permissions associated with the managed asymmetric key specifying cryptographic operations involving the managed asymmetric key that the user is permitted to perform;
   identifying, by the client device, a symmetric key associated with the managed asymmetric key;
   receiving, by the client device, an encrypted form of the symmetric key from the client device, the encrypted form of the symmetric key obtained by encrypting the symmetric key with a public key;
   determining, by the client device, that the identified cryptographic permissions are sufficient to decrypt the symmetric key associated with the managed asymmetric key; and
   responsive to determining, by the client device, that the identified cryptographic permissions are sufficient to decrypt the symmetric key associated with the managed asymmetric key:
   obtaining, by the client device, a decrypted form of the symmetric key by decrypting the encrypted form of the symmetric key using a private key corresponding to the public key, and providing, by the client device, the decrypted form of the symmetric key to the client device.

17. The computer-implemented method of claim 16, wherein the managed asymmetric key specifies the public key and the private key.

18. The computer-implemented method of claim 16, wherein the managed asymmetric key is associated with a plurality of managed symmetric encryption keys.

19. The computer-implemented method of claim 18, wherein the managed symmetric encryption keys include an associated validity period and an associated end of life.

20. The computer-implemented method of claim 19, the performed steps further comprising, at expiration of the validity period of one of the managed symmetric encryption keys:
   marking the managed symmetric encryption key as expired; and
   automatically creating a new symmetric encryption key and associating the new symmetric encryption key with the managed asymmetric key.

* * * * *